(12) United States Patent
Dvorak

(10) Patent No.: US 7,023,320 B2
(45) Date of Patent: Apr. 4, 2006

(54) SYSTEM AND METHOD FOR PREVENTING UNAUTHORIZED USE OF A DEVICE

(75) Inventor: Joseph L. Dvorak, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 167 days.

(21) Appl. No.: 10/607,009

(22) Filed: Jun. 26, 2003

(65) Prior Publication Data

US 2004/0263318 A1 Dec. 30, 2004

(51) Int. Cl.
*G05B 19/00* (2006.01)

(52) U.S. Cl. .................... 340/5.53; 340/5.3; 340/5.31; 340/5.81; 340/5.82; 340/5.83; 340/5.52; 382/115; 382/209; 2/94; 2/102; 2/108

(58) Field of Classification Search ............... 340/5.3, 340/5.31, 5.81, 5.82, 5.83, 5.52, 5.53; 382/115, 382/209; 361/683; 2/94, 102, 108
See application file for complete search history.

(56) References Cited

U.S. PATENT DOCUMENTS

| 6,215,498 | B1* | 4/2001 | Filo et al. .................. 345/419 |
| 6,766,040 | B1* | 7/2004 | Catalano et al. ............ 382/115 |
| 6,848,052 | B1* | 1/2005 | Hamid et al. ............... 713/186 |
| 2002/0145849 | A1* | 10/2002 | Peterson .................... 361/683 |

\* cited by examiner

*Primary Examiner*—Brian Zimmerman
*Assistant Examiner*—Vernal Brown
(74) *Attorney, Agent, or Firm*—Larry G. Brown

(57) ABSTRACT

A system (100) and method (200) for preventing unauthorized use of a device (114). The system (100) includes a biometric reader (110) and an authentication unit (112). The biometric reader (110) measures a biometric characteristic and transmits the measured biometric characteristic to the authentication unit (112) over a communications link (118). The device (114) is embedded within a garment (116), and the authentication unit (112) transmits an authorizing signal to the device (114) when the authentication unit (112) biometrically identifies a user. In one arrangement, the authentication unit (112) can include a database (134) for storing authorized biometric samples. The authentication unit (112) can compare the measured biometric characteristic with the authorized biometric samples when the authentication unit (112) receives the measured biometric characteristic from the biometric reader (110).

15 Claims, 5 Drawing Sheets

SYSTEM AND METHOD FOR PREVENTING UNAUTHORIZED USE OF A DEVICE

CROSS REFERENCE TO RELATED APPLICATIONS (Not Applicable)

BACKGROUND

1. Technical Field

This invention relates in general to wearable electronics and more particularly, to security for such electronics.

2. Description of the Related Art

Several companies are currently embedding various types of electronics in articles of clothing. For example, a number of manufacturers have placed electronic devices such as mobile phones, global positioning system (GPS) trackers and video cameras within jackets or other outerwear. Some of these wearable electronics may contain sensitive information or may provide access to charge-incurring services. An unauthorized user of a garment that includes wearable electronics may have access to such information and may incur charges through the use of these services, which will be billed to the owner of the garment.

As an example, some articles of clothing include cellular telephones embedded within them. If an unauthorized individual were to acquire such a garment, this person would have unencumbered access to the services provided by the owner's cellular telephone. Even worse, such an individual may be able to access sensitive information stored in the memory of the cellular telephone.

SUMMARY OF THE INVENTION

The present invention concerns a system for preventing unauthorized use of a device. The system includes a biometric reader and an authentication unit. The biometric reader measures a biometric characteristic and transmits the measured biometric characteristic to the authentication unit over a communications link. The device is embedded within a garment, and the authentication unit transmits an authorizing signal to the device when the authentication unit biometrically identifies a user.

In one arrangement, the authentication unit includes a database for storing at least one authorized biometric sample. The authentication unit can compare the measured biometric characteristic with the authorized biometric samples when the authentication unit receives the measured biometric characteristic from the biometric reader. Additionally, the authentication unit can transmit the authorizing signal to the device when the measured biometric characteristic matches at least one of the authorized biometric samples stored in the authentication unit. In response to the authorizing signal, the device can grant access to the user who has been biometrically identified.

The biometric reader can include a transceiver, and the authentication unit can also include a transceiver. As an example, the transceiver of the biometric reader can transmit the measured biometric characteristic to the transceiver of the authentication unit over a wireless communications link. As another example, the biometric reader can be a fingerprint reader.

In one particular embodiment of the system, the biometric reader can be incorporated in a garment opening mechanism. The biometric reader can measure the biometric characteristic when a user operates the garment opening mechanism. For example, the garment opening mechanism can be a zipper or at least one snap.

The biometric reader can include a first power source, and the authentication unit can include a second power source. The second power source can charge the first power source. In one arrangement, the garment opening mechanism can include a first portion having a set of first electrical contacts and a second portion having a corresponding set of second electrical contacts. When the first portion is in contact with the second portion, the second power source can charge the first power source through the first and second electrical contacts.

The present invention also concerns another system for preventing unauthorized use of a device. The system includes an authentication unit and a controller embedded within a garment. The authentication unit identifies an authorized user and transmits a first authorizing signal to the controller when the authentication unit identifies the authorized user. In addition, the device is embedded with the garment, and when the controller receives the first authorizing signal, the controller transmits a second authorizing signal to the device.

The present invention also concerns a method for preventing unauthorized use of a device. The method includes the steps of measuring a biometric characteristic, comparing the measured biometric characteristic with at least one stored biometric sample to determine if the measured biometric characteristic is from an authorized user and transmitting an authorizing signal to a device embedded within a garment if the measured biometric characteristic is from an authorized user. The method can also include the steps of transmitting the measured biometric characteristic over a wireless communications link, performing the measuring step when a user operates a garment opening mechanism and granting access to the device in response to the transmitting step.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
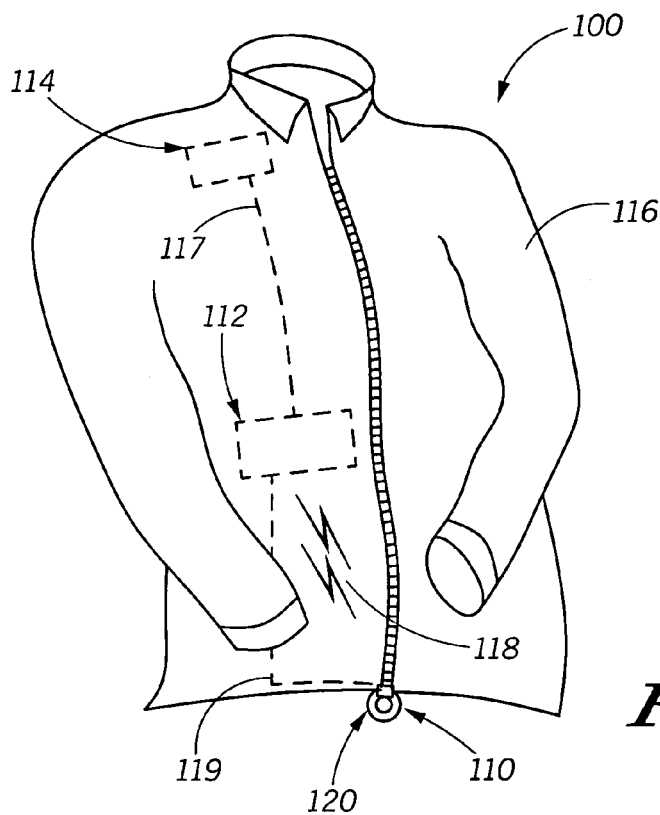
FIG. 1 illustrates a system for preventing unauthorized use of a device in accordance with the inventive arrangements.

While the specification concludes with claims defining the features of the invention that are regarded as novel, it is believed that the invention will be better understood from a consideration of the following description in conjunction with the drawing figures, in which like reference numerals are carried forward.

Referring to FIG. 1, a system 100 for preventing unauthorized use of a device is illustrated. The system 100 can include a biometric reader 110, an authentication unit 112 and a device 114. In one arrangement, the biometric reader 110, the authentication unit 112 and the device 114 can all be embedded within a garment 116. For purposes of the invention, the phrase "embedded within a garment" can mean at least partially disposed within or on the fabric or other material or structure of any suitable piece of clothing or any article that is capable of being worn or wrapped around, for example, a human being, an animal or even a machine.

The biometric reader 110 can measure a biometric characteristic of a user and can transmit the measured biometric characteristic to the authentication unit 112 over a communications link 118. If the authentication unit 112 biometrically identifies the user, the authentication unit 112 can transmit an authorizing signal to the device 114 over another communications link 117. Once it receives the authorizing signal from the authentication unit 112, the device 114 can grant access to the user who has been biometrically identified. The system 100 can also include a power link 119 for selectively transferring power from the authentication unit 112 to the biometric reader 110.

The device 114 can be any machine or component capable of receiving an authorizing signal from the authentication unit 112 and, in response to the authorizing signal, granting to the biometrically identified user access to its operation or use. For example, the device 114 can be a cellular telephone, a personal digital assistant (PDA) or a video camera.

In one arrangement, the biometric reader 110 can be incorporated in a garment opening mechanism 120, such as a zipper. When a user operates the garment opening mechanism 120, the biometric reader 110 can measure one or more biometric characteristics of the user. For example, if the garment opening mechanism 120 is a zipper, the biometric reader 110 can be a fingerprint reader built into the zipper. When a user places his or her finger on the zipper, i.e., the garment opening mechanism 120, for purposes of zipping up the garment 116, the fingerprint reader, i.e., the biometric reader 110, can measure the user's fingerprint as the user pulls the zipper up to close the garment 116. This process will be described in detail below.

It is important to note that the system 100 is in no way limited to being incorporated into a garment. Specifically, one or more of the elements that make up the system 100 can be built into any suitable article or device in which it is desirable to restrict access to a particular element or component of that article or device. For example, one or more elements of the system 100 can be built into a laptop computer or a cellular telephone to prevent access to the operation of these devices or any information stored by them.

Figure 2:
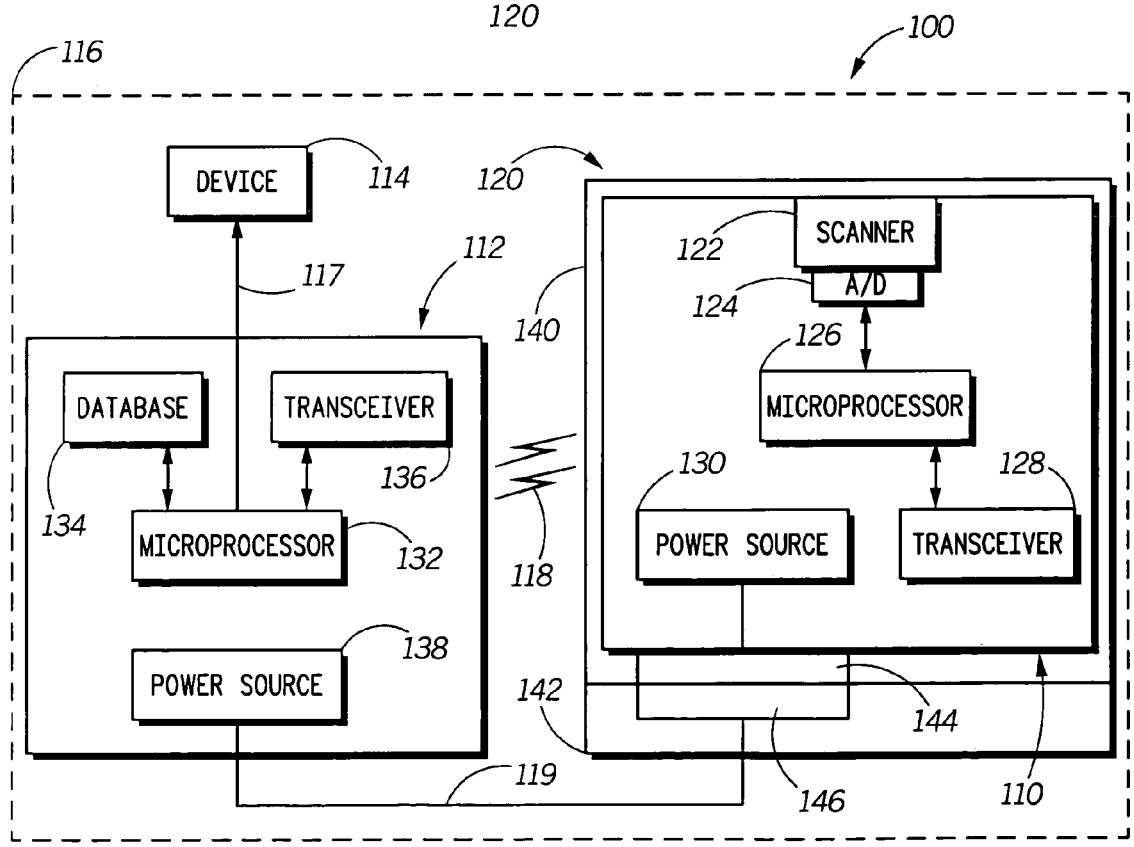
FIG. 2 illustrates a block diagram of the system of FIG. 1 in accordance with the inventive arrangements.

Referring to FIG. 2, a block diagram illustrating the system 100 is shown. In this arrangement, the biometric reader 110, the authentication unit 112 and the device 114 can all be embedded within the garment 116. As noted earlier, however, one or more of these elements may be incorporated into any other suitable article or device.

The biometric reader 110 can include, for example, a fingerprint scanner 122, an analog-to-digital (A/D) converter 124, a microprocessor 126, a transceiver 128 and a first power source 130. Control and data interfaces can also be supplied to permit the microprocessor 126 to control the operation of and/or exchange data with the scanner 122 and the transceiver 128. Further, the authentication unit 112 can include a microprocessor 132, a database 134, a transceiver 136 and a second power source 138. Similar to the biometric reader 110, the authentication unit 112 can include control and data interfaces to permit the microprocessor 132 to control the operation of and/or exchange data with the database 134 and the transceiver 136. In addition, the microprocessor 132 can be coupled to the device 114 through communications link 117 for purposes of transmitting an authorizing signal to the device 114.

In one arrangement, the fingerprint scanner 122 can be a capacitance scanner. As is known in the art, a capacitance scanner detects varying levels of capacitance along portions of the skin of a person's finger. When detected, the capacitance scanner can produce different voltage outputs that, when summed together, correspond to the ridges and valleys of the fingerprint being scanned. In another arrangement, the fingerprint scanner 122 can be an optical scanner. As is also known in the art, an optical scanner illuminates a person's finger and employs a charge couple device to generate electrical signals in response to the light that is reflected from the finger. These electrical signals represent an image of the fingerprint. In either arrangement, the A/D converter 124 can digitize the collected data.

Those of ordinary skill in the art will appreciate that the fingerprint scanner 122 is not limited to the examples described above, as any other suitable system for scanning fingerprints can be employed. Moreover, the invention is not limited to scanning fingerprints, as any other suitable biometric characteristic can be measured. For example, the biometric reader 110 can also be constructed to perform retinal or iris scans or to capture samples of a person's voice.

The measured, digitized biometric characteristic can be transferred from the A/D converter 124 to the microprocessor 126. The microprocessor 126 can then transfer the digitized data to the transceiver 128, where it can be processed for transmission and transmitted to the transceiver 136 of the authentication unit 112 over the communications link 118. In one arrangement, the communications link 118 can be a wireless communications link. Suitable examples of wireless transmission standards include Bluetooth or IEEE 802.15.4. Of course, any other suitable wireless transmission standard can be practiced with the invention. It is understood, however, that the communications link 118 is not limited to a wireless link, as the communications link can also be a hard-wired communications link.

The transceiver 136 of the authentication unit 112 can receive and process the biometric data from the biometric reader 110. This data can then be transmitted to the microprocessor 132. Once the microprocessor 132 receives the biometric data, the microprocessor 132 can compare the measured biometric data with one or more biometric samples that are stored in the database 134. The microprocessor 132 can be programmed with any suitable algorithm for executing this comparison step.

As an example, the biometric samples stored in the database 134 can be fingerprint images of authorized users. The microprocessor 132 can compare the measured fingerprint image that it received from the biometric reader 110 and can compare this fingerprint image with the fingerprint samples in the database 134.

If the microprocessor 132 determines that the measured biometric characteristic matches a biometric sample stored in the database 134, i.e., the authentication unit 112 biometrically identifies a user, the microprocessor 132 can transmit an authorizing signal to the device 114 over the communications link 117. Although illustrated as a hardwired connection, it is understood that the communications link 117 may also be a wireless communication link that employs any suitable transmission standard for operation.

When it receives the authorizing signal, the device 114 can grant access to the user whose biometric characteristic(s) was measured. As an example, if the device 114 is a cellular telephone, when the cellular telephone receives the authorizing signal, the user can be granted access to place or receive calls on the telephone. Of course, if there is no match, then the microprocessor 132 will not transmit an authorizing signal to the device 114, and the user will not be granted access to the device 114.

The database 134 of the authentication unit 112 can be loaded with any suitable number and type of biometric samples from an authorized user. As an example, the microprocessor 126 of the biometric reader 110 and the microprocessor 132 of the authentication unit 112 can be programmed to execute an initialization process. During this initialization process, the relevant biometric characteristic of the authorized user can be measured, and the microprocessor 126 can instruct the transceiver 128 to transmit this measurement to the transceiver 136. The transceiver 136 can receive the biometric data and can transfer it to the microprocessor 132, which can then load the data into the database 134. These loaded samples can then be used to biometrically identify authorized users in accordance with the discussion above.

Figure 3:
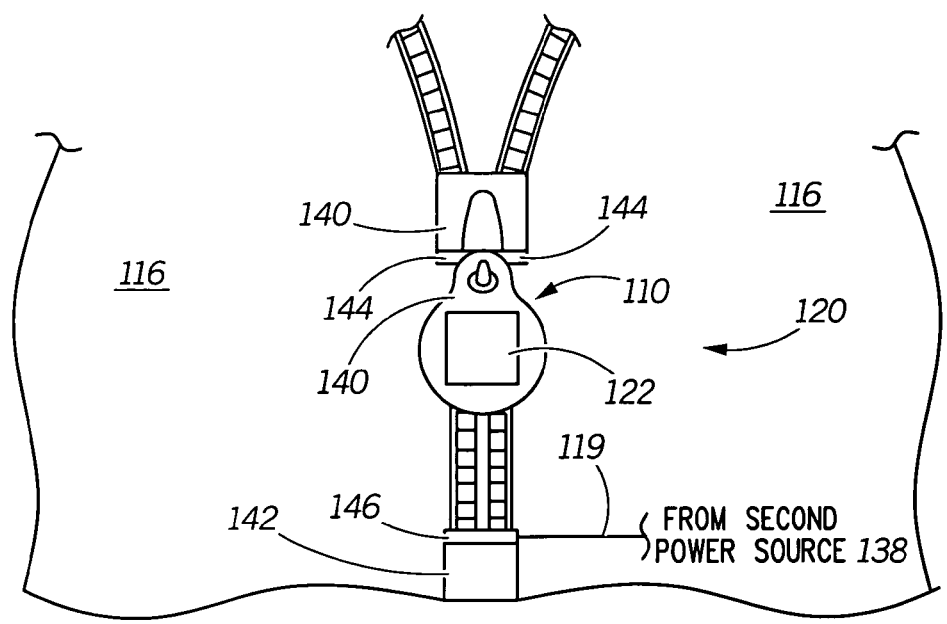
FIG. 3 illustrates an example of a biometric reader incorporated in a garment opening mechanism in accordance with the inventive arrangements.

As explained earlier, the biometric reader 110 can be incorporated in a garment opening mechanism 120. An example of a garment opening mechanism 120 is illustrated in FIG. 3. The garment opening mechanism 120 can be a part of the garment 116, although the garment opening mechanism 120 is not limited to being incorporated in such a structure. In this example, the garment opening mechanism 120 can be a zipper, and the fingerprint scanner 122 of the biometric reader 110 is easily accessible by a user.

Referring to FIGS. 2 and 3, the garment opening mechanism 120 can include a first portion 140 and a second portion 142. The first portion 140 can include a set of first electrical contacts 144, and the second portion 142 can include a corresponding set of second electrical contacts 146. As best shown in FIG. 2, the second electrical contacts 146 can be coupled to the second power source 138 of the authentication unit 112 through the power link 119, and the first electrical contacts 144 can be coupled to the first power source 130 of the biometric reader 110.

Figure 4:
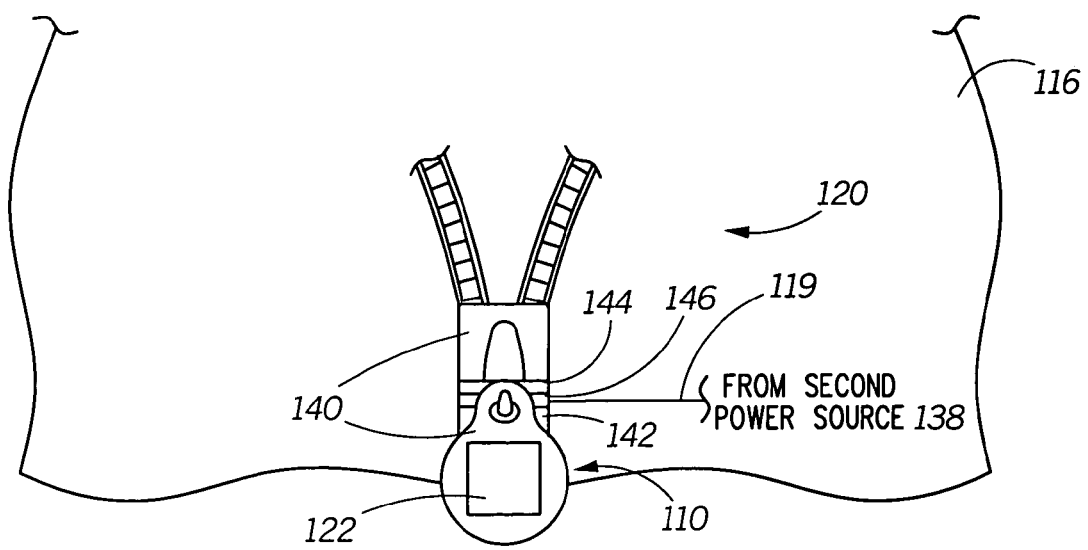
FIG. 4 illustrates a first portion of the garment opening mechanism of FIG. 3 in contact with a second portion of the garment opening mechanism in accordance with the inventive arrangements.

Referring to FIG. 4, when the first portion 140 is forced down until it contacts the second portion 142, the first electrical contacts 144 can be positioned against the second electrical contacts 146. Referring to FIG. 2 once again, when the first electrical contacts 144 are positioned against the second electrical contacts 146, the second power source 138 of the authentication unit 112 can charge the first power source 130 of the biometric reader 110 through the power link 119 and the first and second electrical contacts 144, 146. In one arrangement, the second power source 138 can be one or more disposable batteries, and the first power source 130 can be one or more rechargeable batteries. It is understood, however, that the first power source 130 and the second power source 138 are not limited to these examples; any other suitable power supply can serve as the first power source 130 or the second power source 138.

Figure 5:
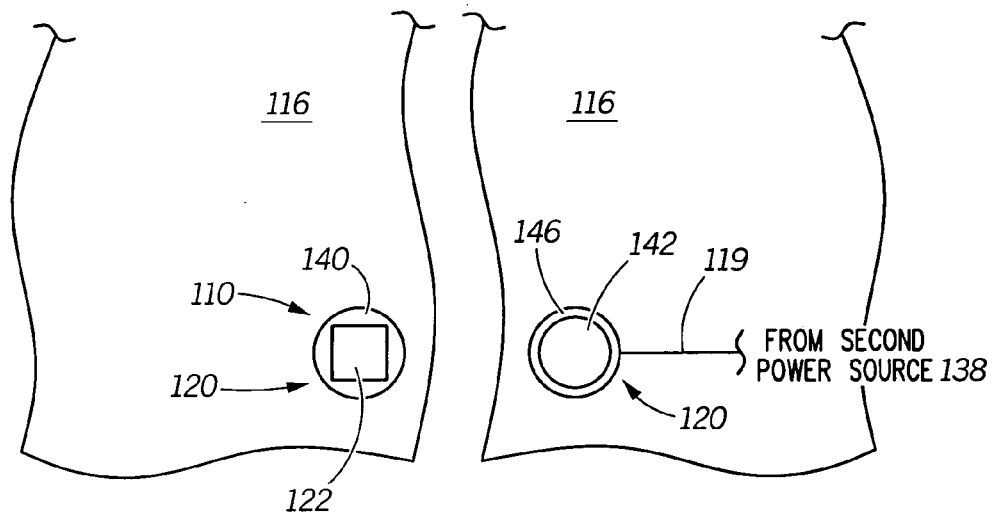
FIG. 5 illustrates another example of a biometric reader incorporated in a garment opening mechanism in accordance with the inventive arrangements.
Figure 6:
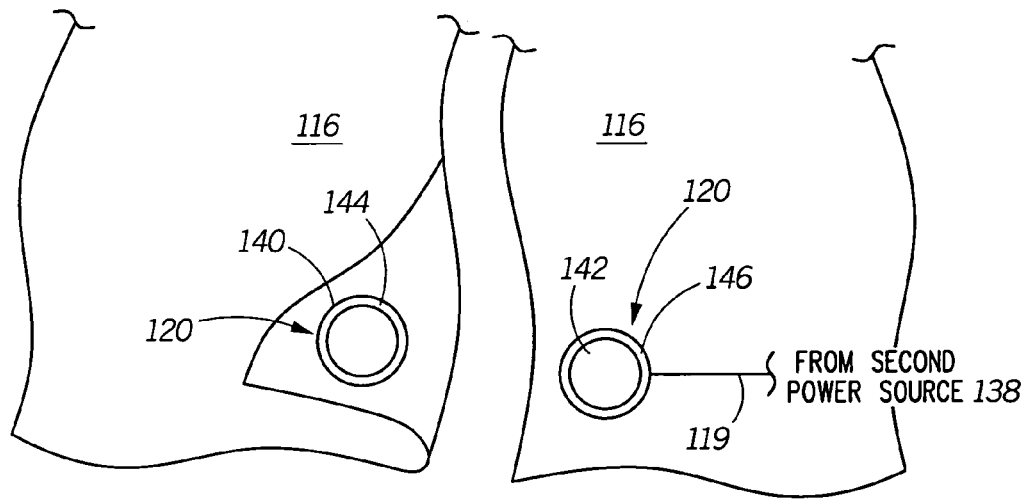
FIG. 6 illustrates a rear view of a portion of the garment opening mechanism of FIG. 5 in accordance with the inventive arrangements.

Referring to FIGS. 5 and 6, as another example, the garment opening mechanism 120 can be a snap button, a fastener commonly found on jackets and other articles of clothing. Without limitation, this garment opening mechanism 120 can also be part of a garment 116. In this example, the garment opening mechanism 120 can also include a first portion 140 and a second portion 142 in which the first and second portions 140, 142 serve as the two engaging elements of a snap button.

Like the embodiment described in relation to FIGS. 3 and 4, the biometric reader 110 can be incorporated into the garment opening mechanism 120, with the fingerprint scanner 122 located on the first portion 140 for easy user access. As shown in FIG. 5, the second portion 142 can include the second electrical contact 146, which can be electrically coupled to the power link 119. Referring to FIG. 6, the backside of the first portion 140 is illustrated to show that the first portion 140 contains the first electrical contact 144.

Figure 7:
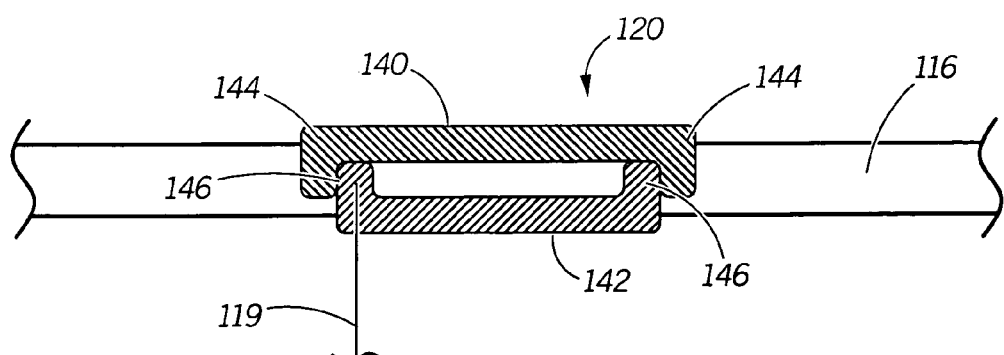
FIG. 7 illustrates a cross-sectional view of a first portion of the garment opening mechanism of FIG. 5 engaged with a second portion of the garment opening mechanism in accordance with the inventive arrangements.

Referring to FIG. 7, a cross-sectional view of the garment opening mechanism 120 is shown in which the first portion 140 is in contact with the second portion 142, i.e., the first portion 140 is snap-engaged with the second portion 142. Referring back to FIG. 2, when the first portion 140 is in contact with the second portion 142, the second power source 138 can charge the first power source 130 through the power link 119 and the first and second electrical contacts 144, 146.

Figure 8:
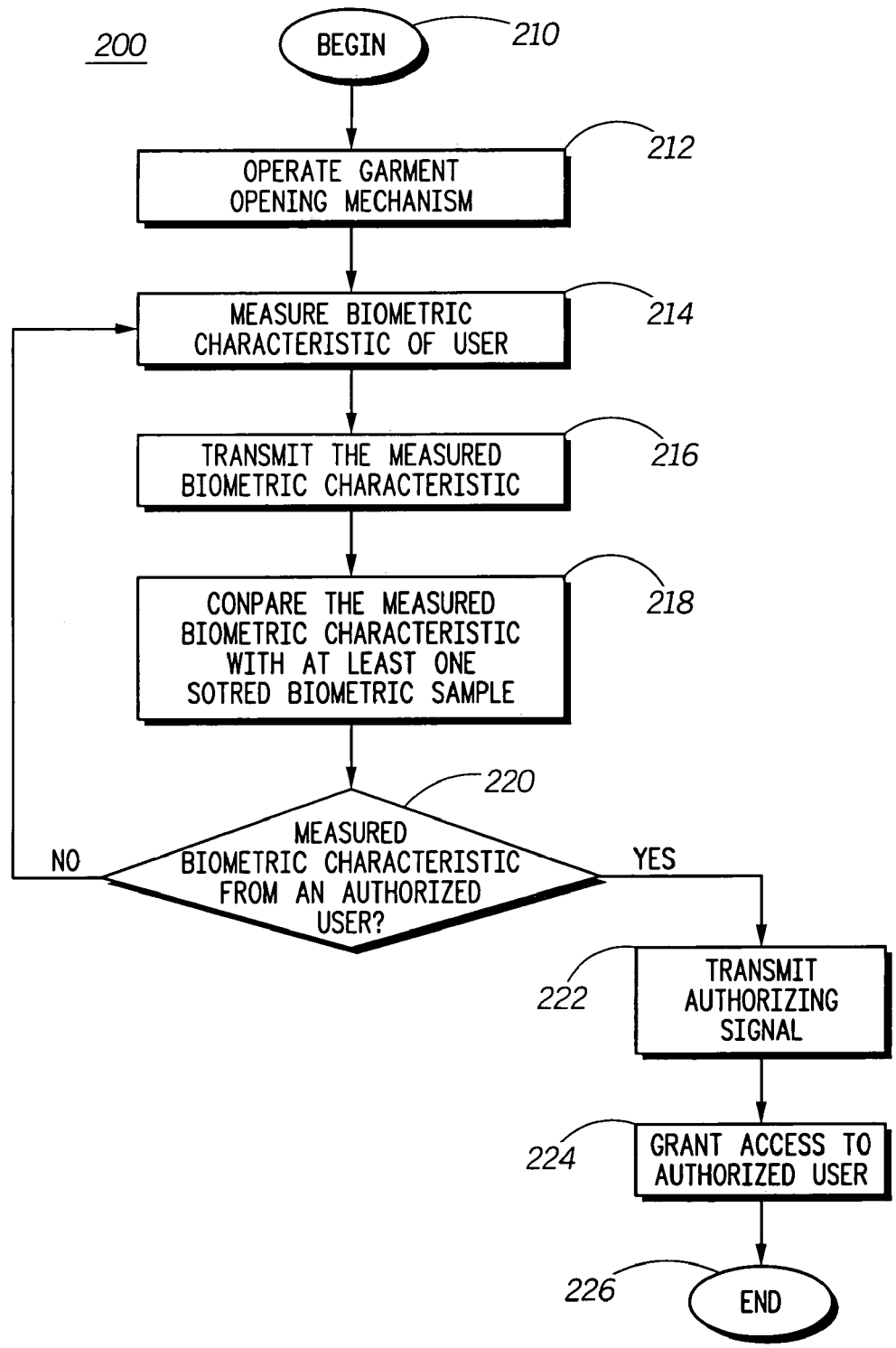
FIG. 8 illustrates a method of operating the system of FIG. 2 in accordance with the inventive arrangements.

A method 200 illustrating the operation of the system 100 is shown in FIG. 8. The steps of the method 200 will be discussed in relation to the components of the system 100 that has been previously described. Nevertheless, the invention is not limited in this regard, as the steps of the method 200 can be practiced in any other suitable system.

Referring to FIGS. 2 and 8, at step 210, the method 200 can begin. At step 212, a user can grasp the garment opening mechanism 120 and operate the garment opening mechanism 120. As an example, if the garment opening mechanism 120 is a zipper for the garment 116 (see FIGS. 3–4), the user can grasp the zipper and force it up to zip up the garment 116. Similarly, if the garment opening mechanism 120 is a snap button for a garment (see FIGS. 4–7), the user can grasp the first portion 140 and the second portion 142 and engage the first and second portions 140, 142 to begin closing the garment 116.

During the operating step 212, the biometric reader 110 can measure a biometric characteristic of the user, as shown at step 214. At step 216, the biometric reader 110 can then transmit the measured biometric characteristic to the authentication unit 112 over, for example, a wireless communications link. At step 218, the authentication unit 112 can compare the measured biometric characteristic with at least one stored biometric sample. At decision block 220, it can be determined whether the measured biometric characteristic is from an authorized user.

If the authentication unit 112 determines that the measured biometric characteristic is from an authorized user at decision block 220, the method 200 can resume at step 222.

At step 222, the authentication unit 112 can transmit an authorizing signal to the device 114, which can be embedded in the garment 116. In response to the receipt of the authorizing signal, the device 114 can grant access to the authorized user, as shown at step 224. Turning back to decision block 220, if the authentication unit 112 determines that the measured biometric characteristic is not from an authorized user, the method 200 can continue at step 214. Finally, the method 200 can end at step 226.

Figure 9:
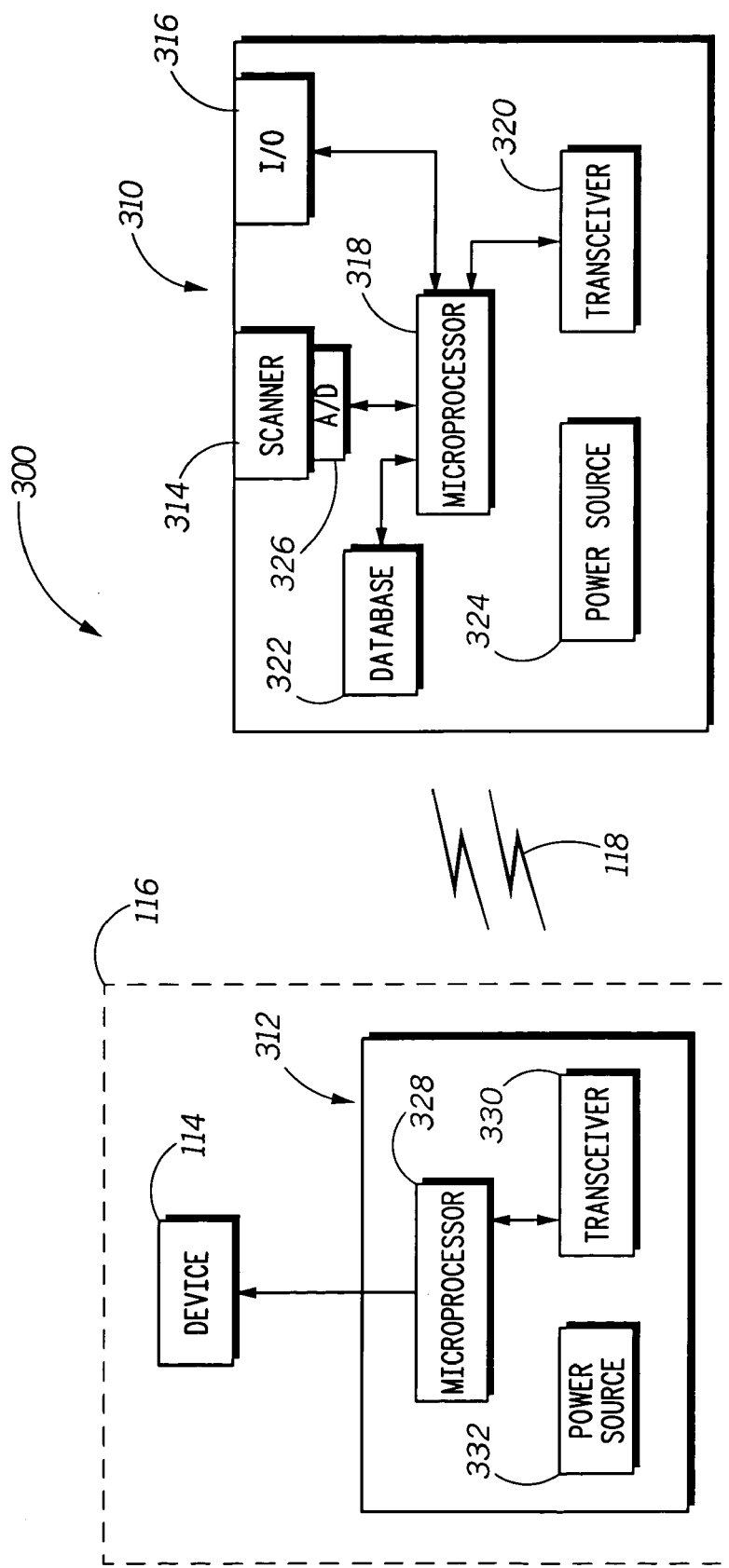
FIG. 9 illustrates another system for preventing unauthorized use of a device in accordance with the inventive arrangements.

Referring to FIG. 9, another example of a system for preventing unauthorized use of a device is illustrated. In this arrangement, a system 300 can include an authentication unit 310, a controller 312 and the device 114. In this example, the controller 312 and the device 114 can be embedded within the garment 116. It must be noted, however, that all or portions of the authentication unit 310, the controller 312 and the device 114 may be embedded within the garment 116.

The authentication unit 310 can include a fingerprint scanner 314, an input/output device 316, a microprocessor 318, a transceiver 320 and a database 322 for storing biometric samples. In addition, the authentication unit 312 can include a power source 324 and an A/D converter 326. The controller 312 can include a microprocessor 328, a transceiver 330 and a power source 332.

The construction and operation of the authentication unit 310 in FIG. 9 is similar to the construction and operation of the biometric reader 110 of FIG. 2. The authentication unit 310, however, includes the fingerprint scanner 314 as well as the database 322 for storing biometric samples. Thus, the step of measuring biometric samples and the step of comparing the measured biometric characteristics with the stored biometric samples can be performed in the authentication unit 310 when the microprocessor 318 is programmed with the proper comparison algorithm.

When the microprocessor 318 determines that a person whose biometric characteristic has been measured is an authorized user, the microprocessor 318 can instruct the transceiver 320 to transmit a first authorizing signal to the controller 312 over the communications link 118. As previously noted, the communications link 118 can be a wireless communications link. The transceiver 330 can receive the first authorizing signal and can transfer the signal to the microprocessor 328. In response, the microprocessor 328 can transmit a second authorizing signal to the device 114, which can cause access to be granted to the user.

The system 300 can employ other ways of identifying whether a user is authorized. Specifically, relevant information can be input into the input/output device 316 and conveyed to the microprocessor 318 to determine if the user is authorized. For example, the input/output device 316 can be a keypad or a keyboard, and the user can enter a password. If the microprocessor 318 recognizes the password, the microprocessor 318 can instruct the transceiver 320 to transmit the first authorizing signal to the controller 312. It must be noted that the invention is not limited to this particular example, as other identifying information can be provided to the authentication unit 312 through the input/output device 316.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A system for preventing unauthorized use of a device, comprising:
    a biometric reader, wherein said biometric reader measures a biometric characteristic; and
    an authentication unit, wherein said biometric reader transmits said measured biometric characteristic to said authentication unit over a communications link;
    wherein the device is embedded within a garment and said authentication unit transmits an authorizing signal to the device when said authentication unit biometrically identifies a user;
    wherein said biometric reader is incorporated in a garment opening mechanism.

2. The system according to claim 1, wherein said authentication unit comprises a database for storing at least one authorized biometric sample and wherein said authentication unit compares said measured biometric characteristic with said authorized biometric samples when said authentication unit receives said measured biometric characteristic from said biometric reader.

3. The system according to claim 2, wherein said authentication unit transmits said authorizing signal to the device when the measured biometric characteristic matches at least one of said authorized biometric samples stored in said authentication unit.

4. The system according to claim 1, wherein said biometric reader comprises a transceiver and said authentication unit comprises a transceiver, wherein said transceiver of said biometric reader transmits said measured biometric characteristic to said transceiver of said authentication unit over a wireless communications link.

5. The system according to claim 1, wherein said biometric reader is a fingerprint reader.

6. The system according to claim 1, wherein said biometric reader measures said biometric characteristic when a user operates said garment opening mechanism.

7. The system according to claim 1, wherein said garment opening mechanism is a zipper.

8. The system according to claim 1, wherein said biometric reader comprises a first power source and the authentication unit comprises a second power source, wherein said second power source charges said first power source.

9. The system according to claim 8, wherein said garment opening mechanism comprises a first portion having a set of first electrical contacts and a second portion having a corresponding set of second electrical contacts, wherein when said first portion is in contact with said second portion, said second power source charges said first power source through said first and second electrical contacts.

10. The system according to claim 1, wherein in response to said authorizing signal, the device grants access to the user who has been biometrically identified.

11. A system for preventing unauthorized use of a device, comprising:
    a biometric reader, wherein said biometric reader measures a biometric characteristic;
    a garment opening mechanism, wherein said biometric reader is incorporated in said garment opening mechanism and said garment opening mechanism is incorporated in a garment; and an authentication unit, wherein said biometric reader transmits said measured biometric characteristic to said authentication unit when a user operates said garment opening mechanism;

wherein the device is embedded within the garment and said authentication unit transmits an authorizing signal to the device when said authentication unit biometrically identifies the user.

12. A method for preventing unauthorized use of a device, comprising the steps of:

measuring a biometric characteristic;

comparing the measured biometric characteristic with at least one stored biometric sample to determine if the measured biometric characteristic is from an authorized user;

transmitting an authorizing signal to a device embedded within a garment if the measured biometric characteristic is from an authorized user; and performing said measuring step when a user operates a garment opening mechanism.

13. The method according to claim 12, further comprising the step of transmitting the measured biometric characteristic over a wireless communications link.

14. The method according to claim 12, further comprising the step of granting access to the device in response to said transmitting step.

15. The system according to claim 1, wherein the biometric reader is part of the authentication unit.

* * * * *